(12) United States Patent
Millett

(10) Patent No.: US 8,037,075 B2
(45) Date of Patent: Oct. 11, 2011

(54) PATTERN INDEX

(75) Inventor: Ronald P. Millett, Orem, UT (US)

(73) Assignee: Perfect Search Corporation, Provo, UT (US)

( * ) Notice: Subject to any disclaimer, the term of this patent is extended or adjusted under 35 U.S.C. 154(b) by 390 days.

(21) Appl. No.: 12/211,713

(22) Filed: Sep. 16, 2008

(65) Prior Publication Data

US 2009/0019038 A1  Jan. 15, 2009

Related U.S. Application Data

(62) Division of application No. 11/328,863, filed on Jan. 10, 2006, now abandoned.

(51) Int. Cl.
*G06F 17/30* (2006.01)
(52) U.S. Cl. ........................ 707/741; 707/822
(58) Field of Classification Search .................. 707/741, 707/822, 999.006, 999.102
See application file for complete search history.

(56) References Cited

U.S. PATENT DOCUMENTS

| | | | |
|---|---|---|---|
| 4,961,139 A | 10/1990 | Hong et al. | |
| 5,530,854 A | 6/1996 | Emery et al. | |
| 5,590,716 A | 1/1997 | Mansfield | |
| 5,664,179 A | 9/1997 | Tucker | |
| 5,699,441 A | 12/1997 | Sagawa | |
| 5,701,459 A | 12/1997 | Millett | |
| 5,737,734 A | 4/1998 | Schultz | |
| 5,740,445 A | 4/1998 | Okuda | |
| 5,761,652 A | 6/1998 | Wu | |
| 5,799,312 A | 8/1998 | Rigoutsos | |
| 5,850,565 A | 12/1998 | Wightman | |
| 5,915,249 A | 6/1999 | Spencer | |
| 6,018,733 A | 1/2000 | Kirsch et al. | |
| 6,026,398 A | 2/2000 | Brown | |
| 6,076,051 A * | 6/2000 | Messerly et al. ................. 704/9 |
| 6,128,613 A | 10/2000 | Wong et al. | |
| 6,216,123 B1 | 4/2001 | Robertson et al. | |
| 6,233,571 B1 | 5/2001 | Egger et al. | |
| 6,253,188 B1 | 6/2001 | Witek | |
| 6,473,729 B1 | 10/2002 | Gastaldo et al. | |

(Continued)

FOREIGN PATENT DOCUMENTS

WO  2007082212 A2  7/2007

(Continued)

OTHER PUBLICATIONS

Notice of Allowance mailed in U.S. Appl. No. 11/681,673 Oct. 5, 2009.

(Continued)

*Primary Examiner* — Son T Hoang
(74) *Attorney, Agent, or Firm* — Workman Nydegger

(57) ABSTRACT

A pattern index can be created and used to searching for desired content in electronic databases. The pattern index can include a tuple pattern index containing separately identifiable and indexed tuple entries that are based on combinations of words within the electronic documents. The pattern index and other indexes can also be used in an incrementally graduating search to inherently apply order and priority to the search. Suggested terms and alternate terms, which are different than those that are provided by the user as part of a search request, can also be considered as part of the search and can be provided to the user for selection during the search to dynamically alter the scope of the search and to provide auto-complete functionality.

32 Claims, 5 Drawing Sheets

U.S. PATENT DOCUMENTS

| | | | |
|---|---|---|---|
| 6,584,458 B1 | 6/2003 | Millett et al. | |
| 6,584,465 B1 | 6/2003 | Zhu et al. | |
| 6,658,626 B1 | 12/2003 | Aiken | |
| 6,678,686 B1* | 1/2004 | Patel et al. | 1/1 |
| 6,718,325 B1 | 4/2004 | Chandra | |
| 6,748,401 B2 | 6/2004 | Blackburn | |
| 6,772,141 B1 | 8/2004 | Pratt et al. | |
| 6,778,981 B2 | 8/2004 | Lee | |
| 6,785,677 B1 | 8/2004 | Fritchman | |
| 6,804,664 B1 | 10/2004 | Hartman et al. | |
| 6,947,931 B1 | 9/2005 | Bass et al. | |
| 6,985,904 B1 | 1/2006 | Kaluskar et al. | |
| 6,993,533 B1 | 1/2006 | Barnes | |
| 7,139,753 B2 | 11/2006 | Bass et al. | |
| 7,181,438 B1 | 2/2007 | Szabo | |
| 7,266,553 B1 | 9/2007 | Anderson et al. | |
| 7,296,011 B2 | 11/2007 | Chaudhuri et al. | |
| 7,328,211 B2 | 2/2008 | Bordner et al. | |
| 7,590,716 B2 | 9/2009 | Sinclair | |
| 7,640,363 B2 | 12/2009 | Teodosiu | |
| 2001/0050682 A1 | 12/2001 | Deering et al. | |
| 2002/0099685 A1 | 7/2002 | Takano | |
| 2002/0103799 A1* | 8/2002 | Bradford et al. | 707/6 |
| 2003/0074341 A1 | 4/2003 | Blackburn et al. | |
| 2003/0097356 A1 | 5/2003 | Lee et al. | |
| 2003/0191737 A1* | 10/2003 | Steele et al. | 707/1 |
| 2004/0225497 A1* | 11/2004 | Callahan | 704/235 |
| 2004/0225643 A1 | 11/2004 | Alpha et al. | |
| 2005/0108230 A1 | 5/2005 | Carrol | |
| 2005/0108394 A1 | 5/2005 | Braun et al. | |
| 2005/0114298 A1 | 5/2005 | Fan et al. | |
| 2005/0131872 A1 | 6/2005 | Calbucci et al. | |
| 2005/0171926 A1 | 8/2005 | Thione | |
| 2005/0281469 A1 | 12/2005 | Anderson et al. | |
| 2005/0283468 A1* | 12/2005 | Kamvar et al. | 707/3 |
| 2006/0004740 A1 | 1/2006 | Dettinger | |
| 2006/0036649 A1 | 2/2006 | Simske et al. | |
| 2006/0080361 A1 | 4/2006 | Suzuki | |
| 2006/0106793 A1 | 5/2006 | Liang | |
| 2006/0126916 A1 | 6/2006 | Kokumai | |
| 2006/0195672 A1 | 8/2006 | Inoue | |
| 2006/0212420 A1 | 9/2006 | Murthy | |
| 2006/0235843 A1 | 10/2006 | Musgrove et al. | |
| 2006/0265396 A1 | 11/2006 | Raman | |
| 2007/0027864 A1 | 2/2007 | Collins et al. | |
| 2007/0033165 A1 | 2/2007 | Sheinwald et al. | |
| 2007/0073894 A1 | 3/2007 | Erickson et al. | |
| 2007/0088686 A1* | 4/2007 | Hurst-Hiller et al. | 707/4 |
| 2007/0106876 A1 | 5/2007 | Goswami | |
| 2007/0156677 A1 | 7/2007 | Szabo | |
| 2007/0162481 A1 | 7/2007 | Millett | |
| 2007/0175674 A1 | 8/2007 | Brinson | |
| 2007/0203898 A1 | 8/2007 | Carmona | |
| 2007/0250494 A1 | 10/2007 | Peoples et al. | |
| 2007/0294235 A1 | 12/2007 | Millett | |
| 2008/0018794 A1 | 1/2008 | Fung | |
| 2008/0059462 A1 | 3/2008 | Millett | |
| 2008/0154938 A1 | 6/2008 | Cheslow | |

FOREIGN PATENT DOCUMENTS

WO  2007103815 A2  9/2007

OTHER PUBLICATIONS

Office Action dated Nov. 27, 2009 cited in U.S. Appl. No. 11/847,688.
Office Action dated Jan. 8, 2010 cited in U.S. Appl. No. 11/847,869.
Office Action dated Mar. 4, 2010 cited in U.S. Appl. No. 11/847,784.
Office Action dated Dec. 29, 2008 cited in U.S Appl. No. 11/681,673.
Manning, Christopher D. and Schutze, Hinrich Foundations of Statistical Natural Language Processing, The MIT Press, Cambridge Massachusetts, May 1999 (pp. 151, 158, 192-194, 377 and 532).
Ceglowski, Maciej "Using Bloom Filters", Apr. 8, 2004, http://www.perl.com/pub/a/2004/04/08/bloom_filters.html, 4 pages.
Millett, U.S. Appl. No. 60/779,214, filed Mar. 3, 2006.
Millett, U.S. Appl. No. 11/847,688, filed Aug. 30, 2007.
Millett, U.S. Appl. No. 11/847,869, filed Aug. 30, 2007.
Millett, U.S. Appl. No. 12/143,432, filed Jun. 20, 2008.
Millett, U.S. Appl. No. 12/143,441, filed Jun. 20, 2008.
Mitra, Mandar et al. "An Analysis of Statistical and Syntactic Phrases", Jun. 1997.
Possas, Bruno et al. "Set-Based Vector Model: An Efficient Approach for Correlation-Based Ranking", Oct. 2005.
Office Action mailed Feb. 20, 2008 cited in related case U.S. Appl. No. 11/328,863.
Millett, U.S. Appl. No. 11/328,863, filed Jan. 10, 2006.
Roblee, Chris, "Hierarchical Bloom Filters: Accelerating Flow Queries and Analysis", Lawrence Livermore National Laboratory FloCon 2008, dated Jan. 8, 2008.
U.S. Appl. No. 11/847,688, Mail Date Apr. 1, 2010, Notice of Allowance.
U.S. Appl. No. 12/143,441, Mail Date May 12, 2010, Office Action.
U.S. Appl. No. 13/052,399, filed Mar. 21, 2011, Millett.
U.S. Appl. No. 11/847,784, Mail Date Aug. 19, 2010, Office Action.
U.S. Appl. No. 12/143,432, Mail Date Feb. 17, 2011, Office Action.
U.S. Appl. No. 11/847,869, Mail Date May 13, 2010, Notice of Allowance.
U.S. Appl. No. 12/143,441, Mail Date Dec. 14, 2010, Notice of Allowance.
International Search Report for PCT/US/07/60283 mailed Jun. 10, 2011.

* cited by examiner

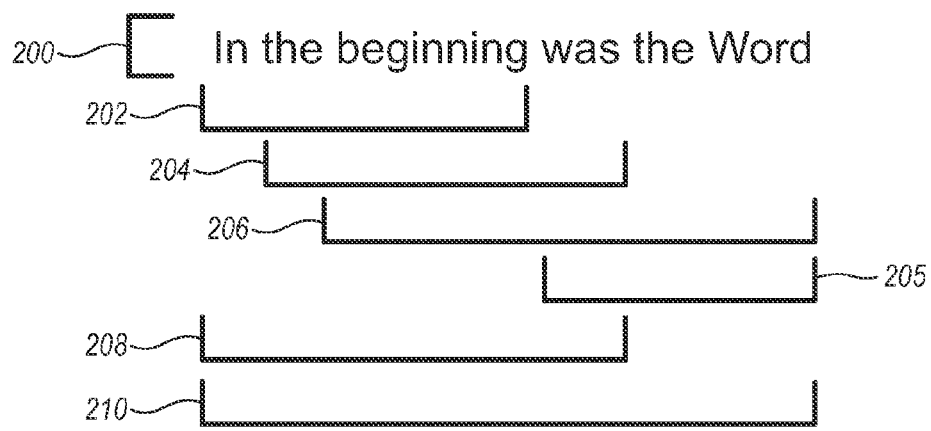
*Fig. 2*
| Sequence | Word # | Word | Attributes |
|---|---|---|---|
| 1 | 1 | In | 1 cap, bk = John c1 v 1 |
| 2 | 2 | the | |
| 3 | 3 | beginning | |
| 4 | 4 | was | |
| 5 | 2 | the | |
| 6 | 5 | Word | 1 cap, cma, proper noun |
*Fig. 3*
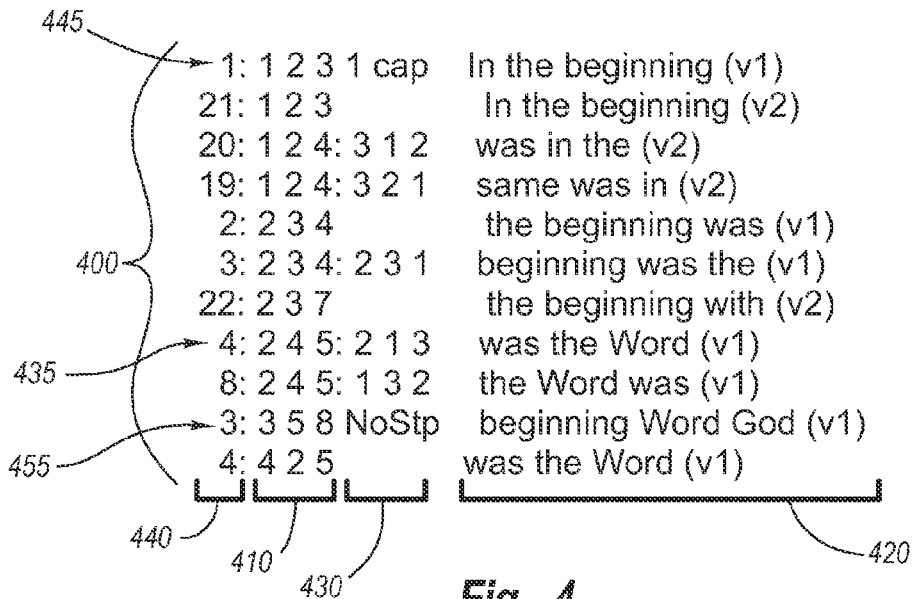
*Fig. 4*

PATTERN INDEX

CROSS-REFERENCE PARAGRAPH

The present application is a divisional application of U.S. patent application Ser. No. 11/328,863, filed Jan. 10, 2006, entitled; "Pattern Index", which is incorporated by reference in its entirety.

BACKGROUND

Background and Relevant Art

Computers have revolutionized the way we work and play. Books, for example, use to only be available on printed paper. However, it is now common for books and other literature to be published in an electronic form. Many older publications, even including those that were printed prior to the computer age, have also been copied and scanned into an electronic form. Accordingly, it is now possible to access virtually any document or text with a computing device through the Internet or other computing network.

Although the computing processes required to store and retrieve electronic documents are well known, the sheer volume of documents and data stored in some databases can still make it difficult as a matter of practice to properly index and find the desired content in a timely fashion. This is particularly true when considering that many databases contain documents with similar or identical content, thereby increasing the difficulty and processing required to distinguish between the various documents.

To facilitate the retrieval of electronic content from a database, several types of search engines and indexes have been developed. Initially, traditional databases, such as the social security death index, were developed with fields of information that could only be searched through a rigid alphabetically ordering of associated fields, such as a last name field. Later, full text indexing was developed to provide greater searching flexibility. With a full text index all words are indexed and can therefore be searched for within a document or record. With full text indexing, it is also possible to simultaneously or sequentially search for a plurality of search terms within the indexed documents and to hopefully improve the accuracy of a search. For example, in a full text search, the documents that are found containing any of the plurality of search terms can be further analyzed for intersecting hits in which different search terms are also found within the same document. The documents having intersecting hits can then be prioritized according to various rules of relevance and provided to the searcher.

Inasmuch as the capabilities of full text indexes have proven to be useful, many of the traditional field indexes have now been modified to allow for full text searching within the various indexed fields. While full text indexing and modified field indexing have provided significant improvements over traditional indexes that only permitted rigid alphabetical searching of fields, there is still a significant need for improvement in searching technology.

The need for improved searching is a practical one, as illustrated by the following examples provided with regard to the 'atomic' type searching performed by existing systems. Existing systems are characterized as performing 'atomic' type searching because every term is essentially search alone and then, only after the indexed hits are found, are intersections discovered and used to filter the search. For example, with the Social Security Death Index (SSDI) a structured query search for Howard Millett born in 1918, using the field search form, will retrieve all document ID numbers with "Millett" entries, all documents with "Howard" entries, and all documents with "1918" entries. The documents are then filtered to provide only the documents having intersecting hits of the three entries (Howard, Millett, and 1918).

In a similar approach, with a structured query on a full text index, all documents are found that have all of the search terms "Millett," "Howard" and "1918" within an intersection of a fixed number of words, such as within 5 words of each other. In an unstructured query full text index search, documents having intersecting hits are retrieved utilizing proximity rules, such as 'within a phrase' or 'near.'

In all of the foregoing scenarios (structured query on a structured field type database, structured query on a full text database, and unstructured query on a full text database), the index is partitioned and broken into clusters. The motivation for forming clusters is the desire to speed up the search. For example, it can be difficult to achieve a desired speed for even a reasonable amount of queries per second when the index being searched corresponds to millions or billions of records. Accordingly, by partitioning the indexed records into clusters of manageable sizes, different servers can be dedicated to searching different clusters of the index.

As an example, suppose it is desired to achieve a search speed of about 200 queries per second for an index of 1 billion records. In this example, records might be partitioned into 100 clusters of about 10 million records each. Then, each server in the server farm having about 2 Gig of RAM can cache most, if not all of the relevant records into RAM. Benchmarks are then performed for searching the clusters to determine how many servers need to be dedicated to each cluster. For example, suppose a search of one server in Cluster 1 achieves a speed of about 50 searches per second, four servers can be dedicated to that Cluster to maintain the desired 200 queries per second search speed. If one server in Cluster 2 provides 20 searches per second, 10 servers can be dedicated to that Cluster to maintain the desired speed. A few servers are also dedicated to managing server allocation to the various clusters and for managing the searches from the top end and for interfacing with the client.

One problem with the foregoing setup, which is provided by existing search services, is that the speed of the search is constrained by the speed of the slowest server. In particular, if all of the servers finish a query in 100 milliseconds, except for one, which takes two seconds, then the search will still take 2 seconds. Another problem is the shear number of servers and clusters that are required in the first place. In particular, although computing equipment is becoming more affordable, it can still be quite expensive to provide a farm of servers that is necessary to adequately meet the demands of the public when it comes to searching databases of any magnitude, such as the Internet, particularly when considering the documents are indexed to an atomic level (each individual term).

It has been reported, for example, that a popular search engine service currently dedicates and utilizes over 100,000 servers to satisfy user search requests for electronic content. It will be appreciated that the large quantity of servers that are needed is based, not only on the processing capabilities of each sever, but the quantity of requests that are serviced and the amount of processing required to service each request. Accordingly, while the processing capabilities of computers are likely to continue to improve, it is also likely that the demand for corresponding computing services will also increase, particularly for services satisfying electronic document search requests.

As mentioned above, a search request for electronic content typically takes the form of a word or a combination of words, referred to herein as search terms. The search engine or will then identify each of the documents containing the search terms. One problem that can be encountered with a typical search is an erroneous spelling of a search term, which may result in a failed attempt at locating a desired document. Although provisions have been made to remedy such errors, current search engines do not provide suggestions to a user regarding which terms will improve the efficiency or effectiveness of a search, or at least until after the search has already been performed, if at all, thereby expending valuable processing resources and time processing search terms that might be irrelevant or relatively insignificant to the search. To overcome this problem, some search engines do appear to provide spelling help. However, the spelling help provided does not relate to the success of a searched result. Accordingly, the spelling help, if any, merely requires misspelled words to be 'atomically' indexed along with the other indexed terms, thereby increasing the processing and computing requirements for the larger index, and without providing any measurable efficiencies.

Another problem with existing search engines is that they indiscriminately expend resources searching for terms of relatively different significance. For example, common terms found in a significant percentage of the documents are relatively insignificant when compared to unique terms or combinations of terms that are found in only one or a relatively few documents. However, even when less common search terms are entered as part of a search, they are searched for, just as are the more unique terms, thereby resulting in a significant volume of documents being identified that contain only the common terms.

To filter and provide some order to the numerous documents satisfying a search, some search engines have established priority rules that are applied to the various documents that have been found to satisfy the search. Priority rules can be applied, for example, to alter the order in which documents satisfying the search are presented to the user, such that documents that are determined to be more potentially applicable or interesting to a user are presented before documents appearing to have less potential. There are many different types of priority rules that can be applied. Some priority rules, for example, consider the frequency in which the search terms occur within a document, the proximity of search terms to other search terms within a document, the identification of search terms within titles or important areas of a document, and the type or source of document in which the term is found, as well as many other considerations.

However, as mentioned above, the priority filtering rules are only applied after the searching has been performed. Accordingly, regardless of which priority rules are applied, the efficiency of the search is still constrained, in some degree, by the need to examine and process each identified document ID number containing the search terms. This is particularly true when the search terms may not help to focus or narrow the search. For example, when a search for a document includes a common term found in many documents, the processing required to analyze each of the documents containing the common term can be onerous and is certainly undesirable, particularly when considering that the processing required by the search engine to provide any meaningful results necessarily requires the application of many different priority rules to each of the identified documents. The application of the various priority rules must also be normalized into some sort of score, which can be computationally expensive.

Keeping track of the relevance of the various search terms during the search process also slows down the servers. An example will now be provided to illustrate this. For instance, if three search terms are identified, the first being found in 100,000,000 documents, the second being found in 10,000,000 documents, and the third being found in 20,000,000, and there is an intersection of the search terms in only 10,000 documents, an expanded relevance intersection might only identify 100 documents. Nevertheless, the relevance information, used to prioritize existing searches must be tracked and carried through the entire search. It will be noted in this example, that it would have been much more beneficial to immediately identify the 100 documents without having to search through and process the millions and millions of documents while tracking and applying the corresponding relevance information to find the intersecting documents.

Searching for electronic content can also be difficult even when the user knows exactly which document to search and is relatively familiar with the document or documents being searched. For example, when a user searches for a referenced passage in a scriptural text, a user can type in the words they think are in the designated passage. However, unless the user is able to craft the search request with the exact words and order in which they are found in the designated passage, they are often inundated with irrelevant or erroneous results. In other words, the user will be presented with many false leads. Furthermore, even if the user is able to recite, as part of the search, all of the words in the desired passage and in the correct order, existing search processes still examine and process the electronic content and references that are irrelevant for the desired search, simply because it contains the recited terms that are also found in various extraneous documents that the user is unconcerned with. Many existing search engines also do not search for exact phrase, unless a user specifies through quotes that the phrase is an exact phrase, something many users are unaware of.

Existing search engines also fail to appreciate or effectively use synonyms as part of a search. In particular, if a search term includes the word "made", existing search engines fail to consider whether a synonymous word "create" would enable a better or more applicable result from the search. In essence, synonyms are similar to misspelled words, in the application of existing search engines. Accordingly, even if they were able to recognize and consider or suggest synonyms, which they do not, any such consideration would require extra indexing without any measurable benefit due to the paradigm in which existing search engines search, namely, an atomic level, word by word. Yet another problem with existing search engines is that they fail to adequately account for the customized behavior of different users and the contexts in which the search is performed. For example, it is not uncommon for different users to intend different things when they use a similar search term. This is due, at least in part, to the fact that different users are operating within different environments or contexts when they perform the search. For example, the term "shell" can intentionally mean different things within the defined contexts of oceanography, firearms and oil refinery. Current search engines, however, to not adequately account for the contextual relevance of a search. Even then, any prioritizing of documents only occurs after all of the documents satisfying the search terms have been found. In this regard, many processing resources are again wasted. The inability of existing search engines to adequately consider context is again based on the relatively myopic approach of atomic searching based on individual terms.

Yet another failing with existing search engines is the inability to adequately and meaningfully interpret user input in real-time, while the search terms are being entered. Instead, existing search engines wait until after the search terms has been completely entered before the search process even begins, thereby wasting valuable time that could have been spent searching. While some computing applications provide auto-complete, none of the existing search engines currently provide this capability, let alone in the real-time and dynamic fashion contemplated by the present invention. Search engines also fail to provide any adequate means for interpreting user input and search terms that are only partially entered.

One practice area in which some of the forgoing limitations are particularly noticeable includes the use of PDAs and other limited input computing systems. In particular, some of the foregoing inadequacies of existing search engines are easily overlooked when a user has the convenience of a full-sized keyboard and has ample time to provide completed input before processing of the input is to even begin. However, in today's busy world, time is often not seen as a convenience and the input interfaces of many compact computing devices can be difficult to manipulate, particularly those of portable computing devices such as telephones and PDAs, which would benefit from search engines that would be able to effectively utilize abbreviations, gross misspellings and shorthand text as part of a search, and particularly in a real-time and helpful manner.

Accordingly, it is clear that there is an ongoing need to improve the systems and methods used to search for electronic content and for indexing documents and structured databases.

BRIEF SUMMARY

The present invention is generally directed to embodiments in which a unique and novel pattern index can be used to facilitate indexing and searching for desired content in electronic documents or database fields and in which an incrementally graduating search can be performed to inherently apply order and priority to the entire search process. The incrementally graduating search can utilizing any combination of the pattern index and/or other indexes, as necessary, to obtain results responsive to a search request and to dynamically alter the scope and results of a search, even before the search is completed. The present invention also applies to unique indexes and databases and for the application of structured or free form queries to the indexed documents and databases.

In some embodiments, the pattern index comprises a tuple index with a plurality of tuple entries corresponding to a plurality of words. The tuple entries in the pattern index can include numeric representations of various word combinations. The tuples can also reflect or, alternatively, ignore the order in which the words are found in the indexed documents. The use of tuples, according to the present invention, applies somewhat of a molecular or grouped approach to searching, whereas existing systems only apply an atomic or individual term approach to searching, which is only later filtered. By applying a grouped or molecular approach, prioritizing and filtering can be performed dynamically during the search, and thereby eliminate the need to process irrelevant documents and content.

Tuples typically, although not necessarily, correspond to adjacent words or a continuous string of words within a document. In some instances, the tuples omit words that are determined to be stop words within a continuous string of words, such that the tuple only includes some of the words found within a string of words of an indexed document. The stop words, which can be any predetermined or user defined words, are, in some instances, common words that are determined to be non-narrowing words or words that will not facilitate or improve the efficiency of a search. Other stop words can also apply, including, but not limited to low frequency terms, proper names, dates, nouns, verbs, or any other characterized term or terms.

Although tuples can correspond to any combination of words, the tuples typically correspond to combinations of at least two words and less than five words. In some instances different tuple indexes are created for the same content. In such embodiments, the different tuple indexes are based on tuples of different size, such that the tuples are based on a different word count combination. For example, a first tuple index can be created with tuples based on a three word count combination, whereas other tuple indexes can be created for the same or different content with tuples based on different word count combinations, such as two, four, five or any other quantity of words. A single search can utilize any combination of tuple types.

In some embodiments, a plurality of indexes, which can be selected from tuple indexes as well as non-tuple indexes is used to perform an incrementally graduating search. The graduating search does not necessarily require processing of each search term or every document containing the search terms. Instead, a first set of search criteria and one or more of the search terms that are determined to have potential for finding relevant search results are applied to one or more indexes to obtain an initial search result. If a more enhanced search is needed at a later time, as determined by the user and/or, automatically, in response to predetermined criteria, then a new or augmented set of search criteria and search term(s) can be applied to the same and/or different indexes that were searched in the first search, and without requiring any new search terms to be provided by the user.

In view of the foregoing, different search terms are in some instances newly considered only after the search incrementally advances between searching stages. In such embodiments, the new search terms can be considered, when it is determined to be necessary, and without requiring the user to enter additional search terms beyond those originally entered with the initial search request. For example, new search terms corresponding to custom or alternative meanings of the original search term(s) can be identified and considered as part of a search, as well as phonetic terms. When the search terms are only partial terms, the original or enhanced search can also include referencing a partial word index to identify words that correspond to the search term comprising a partial word. Accordingly, in this manner, it is possible for a meaningful search to be performed, incrementally as necessary, even when the only input entered by the user comprises partial input.

Although the foregoing suggests the incremental search may incrementally increase the quantity of terms being considered, this is not necessarily true in all instances. For example, in some embodiments, the graduating search includes searching for tuples of a greater size (based on a larger word count) prior to search for tuples of a smaller size (based on fewer words).

The partial word index, tuple index, as well as other indexes described herein can also be used in embodiments wherein suggested search terms are presented to the user as possible search terms that can potentially improve the efficiency and results of a search. For example, dynamic analysis of keystrokes and other entered user input can be performed and applied to the pattern index or other indexes to identify words and combinations of words that match indexed entries.

The context in which a search is performed can also be applied as one of the search criteria to narrow or limit the number of original documents that will be found to satisfy the search in the first instance or in a subsequently enhanced search.

Application of the present invention can enable the successful search for electronic content within a database of indexed electronic documents without necessarily having to process every search term or document containing the search term(s), as well as searching for and finding entries corresponding to search terms that match entries in one or more fields of a traditional field-based database. Accordingly, in this regard, it is possible to dynamically alter the scope of the search and to obtain prioritized results incrementally, as needed and desired, without having to perform priority processing for every document containing the original search term(s).

It will be appreciated that the foregoing Summary is not intended to identify key features or essential features of the claimed subject matter, nor is it intended to be used as an aid in determining the scope of the claimed subject matter. Instead, the foregoing Summary is merely provided to introduce a selection of concepts in a simplified form that are further described in the Detailed Description that follows.

Accordingly, additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an example of a string of text from which combinations of words can be identified and used to create tuples.

FIG. 3 illustrates one embodiment of a table or index that associates words with numbers and a sequence in which words are found in defined content that at least partially corresponds to the string of text shown in FIG. 2.

FIG. 4 illustrates some embodiments of tuple entries that can be indexed in a tuple index, at least some of which correspond to the string of text shown in FIG. 2.

DETAILED DESCRIPTION

The present invention extends to methods, systems and computer program products for creating and using a pattern index, such as a tuple index, and for performing an incrementally graduating search with any combination of the pattern index and/or other indexes.

Computing Environment

As described herein, the embodiments of the present invention may comprise a special purpose or general-purpose computer. Embodiments within the scope of the present invention also include computer-readable media for carrying or having computer-executable instructions or data structures stored thereon. Computer-executable instructions comprise, for example, instructions and data which cause a general purpose computer, special purpose computer, or special purpose processing device to perform a certain function or group of functions.

The computer-readable media carrying the computer-executable instructions can be any available media that can be accessed by a general purpose or special purpose computer. By way of example, and not limitation, such computer-readable media can comprise computer-readable storage media, such as, but not limited to RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-readable media can also include computer-readable transmission media. For example, when information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Figure 1:
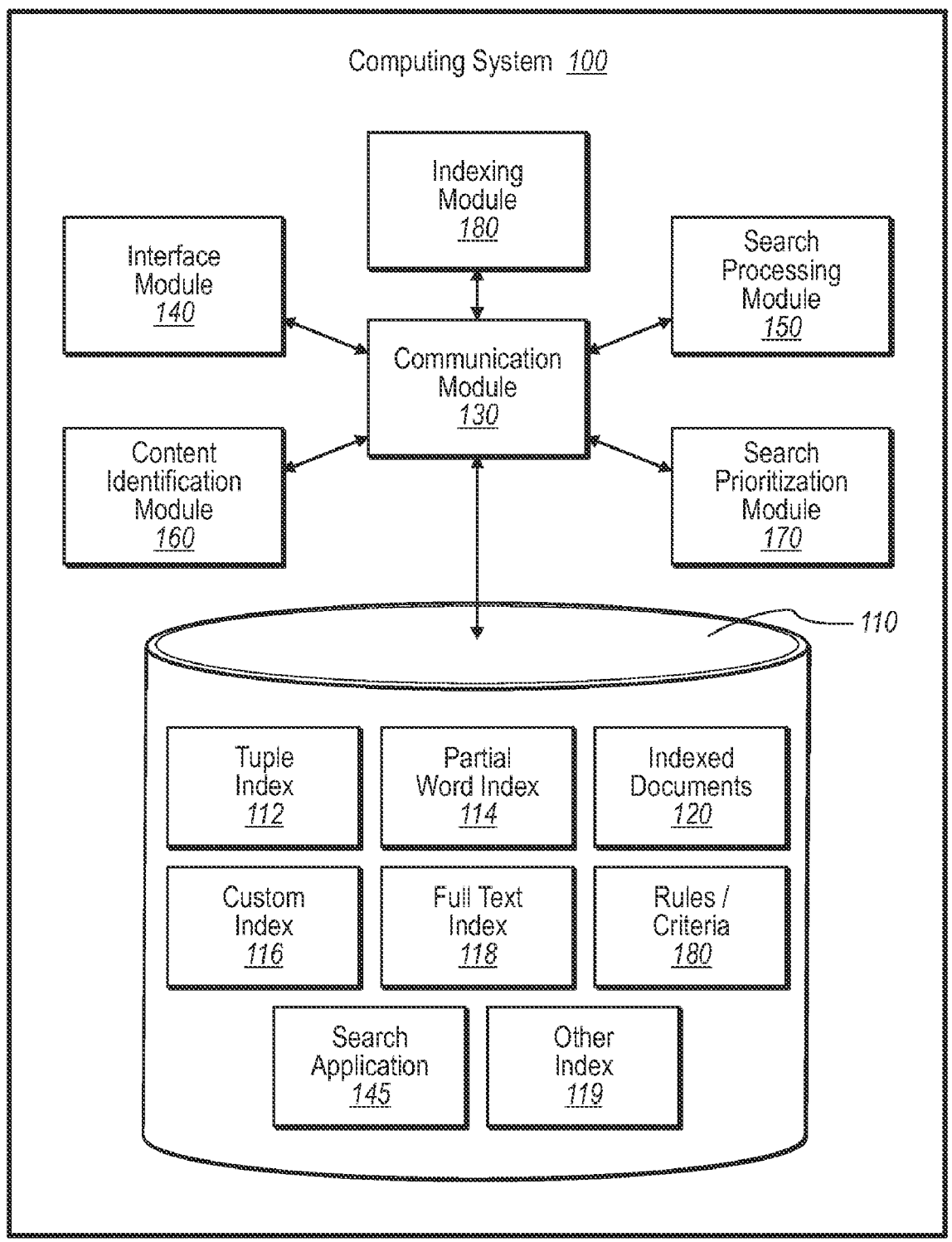
FIG. 1 illustrates one embodiment of a computing network in which certain embodiments of the present invention can be practiced.

Attention will now be directed to FIG. 1, which illustrates one embodiment of a computing system in which the present invention can be practiced. As shown, a computing system 100 is in communication with one or more other computing systems 102 and 104 through one or more communication links 106 and 108. Although computing system is only shown to be connected with two other computing systems 102 and 104 through a network 106 and a direct connection 108, respectively, it will be appreciated that the computing system 100 can communicate with virtually any number of computing devices and through virtually any type of communication link. Accordingly, the computing system 100 can comprise virtually any type of computing system, including a desktop computer, a server, a gateway, and even small portable client computing systems, such as, but not limited to phones, PDAs, and so forth.

The computing system 100 is shown to include a database 110, which can store any or all of the computer-executable instructions described above, which enable execution of the claimed elements described throughout this application. The database 110 can also store any or all of the indexes described herein, including one or more tuple index 112, partial word index 114, custom index 116, full text index 118, one or more other index 119, and so forth, as well as any or all of the indexed documents 120.

Although the database 110 is shown as a single datastore, it will be appreciated that the database 110 can include any number of disparate and connected datastores, comprising any combination of volatile and/or nonvolatile memory, disposed in any combination of local and remote storage locations. For example, in some instances, one or more of the computer-executable instructions, indexed documents, and indexes described herein are physically stored in databases that are disposed remotely from the computing system 100. In such embodiments, the computing system 100 includes sufficient communication means for communicating with the other computing systems or devices that contain the stored data. Such communication means can include any wired or wireless communication modules 130 and devices that enable said communication and that are well-known to those of ordinary skill in the art.

The computing system 100 also includes modules, embodied in one or more interfaces and applications, comprising means or computer-executable instructions for implementing the searching and indexing methods described herein. Inasmuch as these modules can be either relatively self-contained modules of separate programs or integrated modules of a single program, the divisions of the modules, as illustrated in FIG. 1, should not be construed as limiting of the functionality of the invention in any manner. To the contrary, the illustrated modules are merely shown and defined in a manner that can help promote a better understanding of some of the unique and novel aspects of the present invention. For example, modules implementing the present invention can include interface module 140, search processing module 150, content identification module 160, prioritization module 170, and an indexing module 180, each of which will now be described.

Initially, the interface module 140 comprises sufficient computer-executable instructions for enabling communication between a search application 145 and the database 110. The search application 145, which is stored either locally or remotely from the computer system 100, provides the user options for searching for content. In some instances the search application 145 is a standalone application that interfaces with the computing system 100 through the interface module 140. In other embodiments, the search application comprises part of the user interface module 140.

The interface module 140 also includes sufficient computer-executable instructions for presenting an interface to the user for performing searching and for interacting with the user during a search, such as, for example, but not limited to, receiving search terms from a local or remote computing system, providing suggested search terms, enabling auto-complete functionality, providing options for increasing the scope of a search and/or modifying a context of a search, as well as for providing other interfacing options to the user, as described herein.

When it is necessary for the interface module 140 to communicate with the search application 145, the database 110, or any other component or module of the computing system 100, the communication module 130 facilitates and enables said communication. In some embodiments, the communication module 130 can also facilitate and enable communication between all of the modules and components described with regard to the computing system 100, as well as communication between the computing system 100 and remote computing systems 102 and 104.

The search processing module 150 includes sufficient computer-executable instructions for parsing and identifying a search term from user input. In this regard, user input can comprise partially entered search terms, completely entered search terms, or any combination thereof. The search processing module 150 can also convert the user input into an appropriate tuple or other search element that will be applied to the indexes to find appropriate content. The search processing module can also reference many indexes to find completed terms, related words or synonyms corresponding to the user input. The search processing module 150 can provide any such completed or related terms to the interface module 140 to facilitate the functionality described above with regard to the interface module 140.

In some instances, the search processing module 150 also evaluates and considers rules and criteria 180, automatically, or in response to user input, to determine which combination of the user's search terms or other corresponding search terms will be considered as part of a search. The search processing module 150 can also respond appropriately to user input and the rules and criteria 180 necessary to incrementally graduate the scope of the search, by adding new terms and/or changing terms as desired or needed.

The content identification module 160 applies the search data, which is described above, to the database indexes to identify electronic content satisfying the search data. In some instances, this can include finding all electronic documents or content containing search data corresponding to the user input search terms. The identified content is then presented to the user or appropriate application 145.

When desired, the identified documents or content can also be prioritized subsequent to identification through the use of a prioritization module 170 through the application of rules and criteria 180. Prioritization can be used to present some or all of the content identified during the search in an order that is determined to be appropriate for a user (based on interest, content source, content type, relevance, other priorities, and any combination thereof).

Although some existing search engines provide prioritization to search results, existing systems fail to identify and apply prioritization rules prior to first searching for and identifying each document containing the search terms, even if some of the search terms are irrelevant or common terms that are 'atomically' searched for. For at least this reason, the present invention provides advantages over the prior art by providing some embodiments in which prioritization occurs dynamically and in real-time, during the search, by applying a tuple or 'molecular' type search.

The indexing module 180 includes computer-executable instructions for creating a pattern index. In this regard, the indexing module 180 can include or leverage the functionality provided above with regard to the other modules, such as for example, creating tuples. The indexing module 180 can also provide means for creating any of the indexes described in this application, including, but not limited to, the tuple indexes, the partial word indexes, word indexes, full-text indexes, and so forth. The indexing module 180 also provides means for mapping and referencing indexed entries with related content and other indexed entries.

It will be appreciated that in view of the foregoing module descriptions, as well as the following disclosure, that the modules illustrated in FIG. 1 are one example of means for implementing functionality described throughout the application and recited in the claims.

Attention will now be directed to methods of the invention, some of which will be described in terms of acts and steps with reference to the flowcharts 500 and 600 illustrated in FIGS. 5 and 6, and the corresponding illustrations found in FIGS. 2-4. It will be appreciated that when an act or step is referred to in the following description the computer-executable instructions and modules described above comprise means for implementing the recited acts and steps.

To help interpret the scope of the claims and to help promote a better understanding of the following description and claims, a few terms recited in the application will be defined.

The term, "tuple", for example, is defined as a combination of one or more terms or words. The tuples described in many embodiments comprise combinations of terms or words entered as user input corresponding to a search request. Tuples can also be combinations of terms or words identified in a document, such as, for example, by the indexing module 180 or any other module. The tuples can be based on an uninterrupted and continuous string of words or a combination of words selected from a document after certain terms have been omitted. In some embodiments, for example, stop words are omitted from a string of words, such that only the remaining words are formed into a tuple. Although tuples can correspond to terms indexed in a full-text index, they can also apply to terms within different fields of a structured field-based database.

Tuples can comprise any combination of words or terms. Tuples can also be based on words that are identified from a separate index, such as a partial word index, a related word index, corrected spelling word index, or any other index. In some instances, tuples exactly recite the words they represent. In alternative embodiments, tuples take a different form from the words they represent, such as a numerical representation and/or a compressed version of the words represented by the tuple.

With regard to the foregoing, and the rest of the application, it will be appreciated that "term" and "word" are used interchangeably. It will also be appreciated that the referenced "terms" and "words" are not necessarily complete terms and words. Accordingly, the recited "terms" and "words" comprising part of a search or a tuple can also refer to partial and incomplete variations of terms and words, even when they are not explicitly recited as incomplete or partial, such that a reference to a "word" or "term" does not necessarily imply the referenced word or term is a complete word or term. It will be appreciated, however, that some referenced words and terms are complete words or terms.

Some embodiments make reference to "concept words." Concept words are words that are coined or created from the combination of at least two different words or terms. Concept words are distinguished from tuples inasmuch as the concept words typically form part of a tuple. When a concept word forms part of a tuple, it typically carries the same relevance and significance as a single word, even though it is formed from a plurality of words. In some instances, however, the concept words can also be utilized similar to the manner in which tuples are utilized in a search. In particular, some embodiments contemplate searching for electronic content containing a concept word. Concept words can also be utilized in concert with tuples during a search, such as, for example, during an incrementally graduating search.

The term "incrementally graduating", which is generally used in reference to a type of search performed by the invention, generally refers to increasing accuracy or processing with regard to the search being performed. It will be appreciated, however, that incrementally graduating a search does not necessarily improve the results or granularity of a search. Accordingly, the term "incrementally graduating" should be construed broadly to include any change in scope of a search, based on a change in applied criteria or search terms, even if such change actually decreases the granularity or effectiveness of a search. As described herein, some methods of the invention include incrementally graduating a search automatically, or in response to user input, and without requiring a user to provide or select any new terms to be searched for within the indexed electronic content.

The term "electronic content" generally refers to electronic text found within an electronic document or content found within a traditional database. However, electronic content can also refer to other data besides text, so long as it can be referenced. Accordingly, in this regard, electronic images, animations and executables can also be considered electronic content so long as it can be indexed, such as, for example, by using one or more words or terms corresponding to the electronic content. Electronic content can also be defined as either an entire electronic document or only a portion of a document. Accordingly, when references are made to indexing, searching, finding or otherwise accessing and utilizing electronic content, such references should be broadly interpreted to include accessing and utilizing electronic content comprising virtually any type of data.

Tuple Index

In some embodiments of the invention, a tuple index is created for electronic content. The tuple index is different than typical search indexes inasmuch as the tuple index provides references to tuples, which as described above, are combinations of words found within or corresponding to the electronic content.

To further illustrate the concept of a tuple, reference is directed to FIG. 2, which includes a passage of text 200 from John, chapter 1, verse 1 of the Bible: "In the beginning was the Word." From this string of text 200, a plurality of different tuples can be created and indexed into a pattern index.

Figure 5:
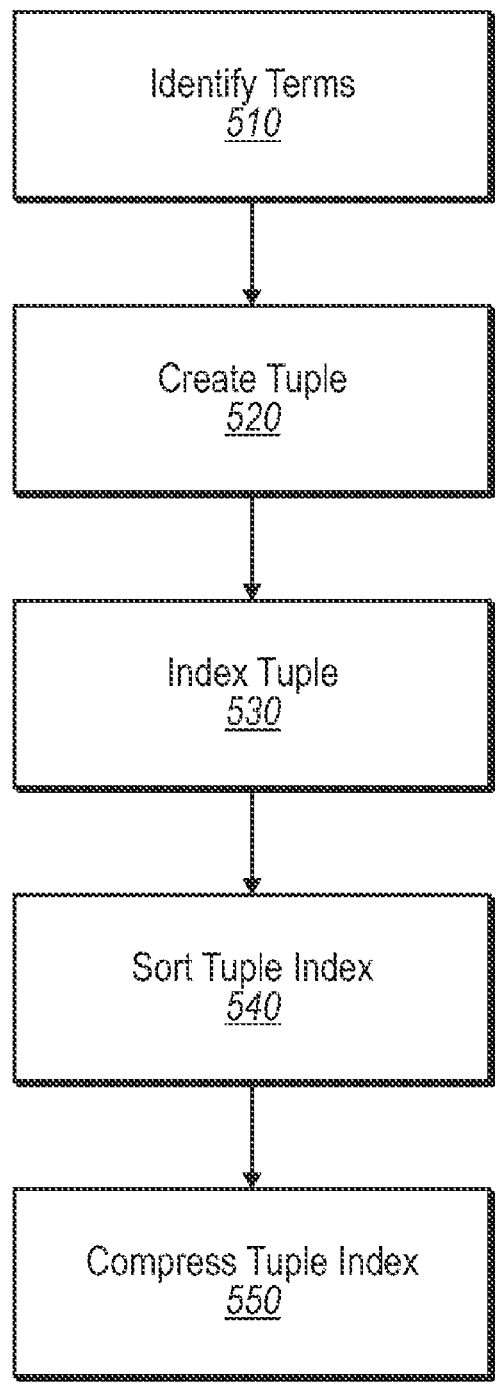
FIG. 5 illustrates a flowchart of acts corresponding to embodiments for creating a tuple index according to certain embodiments of the invention.

One embodiment of methods and acts corresponding to the creation of a pattern index are illustrated in FIG. 5. In particular, FIG. 5 illustrates a flowchart 500 of various acts that can be implemented to prepare a pattern index for subsequent searching. The illustrated acts of the flowchart 500 include identifying terms to be indexed (510), creating a tuple (520) based on the identified terms, indexing the tuple (530), sorting the tuple index (540) and compressing the tuple index (550). It will be appreciated, however, that not all of the acts need to be performed in every instance. For example, in some instances sorting and compression may not occur. It is also important to realize that the scope of the invention also extends to embodiments including more than the recited elements. For example, some methods can include modifying or replacing the terms prior to creating the tuple.

Some of the embodiments corresponding to the method shown in the flowchart 500 of FIG. 5 will now be described with reference to FIGS. 2-4.

The string of text 200 shown in FIG. 2, for example, represents a string of text from which terms can be identified (510). In some instances, the identification of terms includes any combination of corresponding acts, such as reading and parsing a document. If the document is not already in an electronic form, the corresponding acts can also include copying and/or scanning. Likewise, if the document is not a textual document, the corresponding acts of identifying terms can include labeling or describing images, animations, or executables, such that at least some of the terms used in the labels and descriptions are identifiable. Such labels or descriptions can be attached to the non-textual items or maintained in a separate table or index.

Once the terms are identified, they can be used to create a tuple (520). The quantity of terms to be used in a tuple can vary to accommodate various needs and preferences. In some embodiments, tuples are based on combinations of between two and five words. In other embodiments, tuples are based on combinations of even more words.

To create a tuple (520), the identified terms can be combined together. For example, the text identified by combination 202 can be used to form a tuple comprising the text "In the beginning." In fact, a plurality of different combinations 202, 204 and 205 of three consecutive and adjacent words can be used to form tuples based on three words. Tuples can also be created from combinations 206 and 208 of four words from the string of text 200. Reference 210 also suggests that a combination of six words can be identified and selected for combination into a tuple.

In some embodiments referred to herein, tuples can also be created in such a way that they omit stop words. For example, the four word string of consecutive words identified by bracket 206 could be used to form a tuple based on four words as well as a tuple based on three words or even two words if the terms "was" and "the" were considered stop words and were omitted from the tuple. To determine which stop words should be omitted from a string of text, a separate stop word index can be referenced, as described in more detail below.

Tuples can also be created after first replacing at least some of the terms with different terms or characters. For example, some tuples can be composed of numerical representations of the words they represent. The numerical representations of the terms can be based on any predetermined or dynamic referencing scheme. For example, in one embodiment an index or table of words with corresponding numerical references is created, wherein the numerical references are dynamically assigned to the various words of the index in the order in which they are found in a document. In some embodiments, a master index or table of common or popular words can also assign numerical references to words based on any predetermined criteria, such as, but not limited to frequency of use, word type, word size, and so forth.

FIG. 3 illustrates one embodiment in which a word table 300 has been created for the string of text 200 of FIG. 2. In this example, the table 300 includes numerical references 310 for the words 320 of the text 200 of FIG. 2, which are based on a sequence 330 in which the words are found in the text 200. For example, the word "the" is sequentially identified as term number 2. Accordingly, it is indexed as such for each occurrence of the term. The scope of the invention is not so limited, however. For example, the terms can be associated with numerical references based on a sorted frequency, with the first term being the most frequent. In other embodiment, the terms can be alphabetized or sorted according to another pattern prior to assigning reference numerals. Alphabetizing or sorting according to frequency or another defined schema can be particularly helpful for improving the speed at which the search can be performed with the tuples.

The sequence of the word occurrence within a string of text can be helpful for providing search results that link to specific terms in electronic content. The sequence of the words can also be helpful to identify and distinguish different tuples having the same words, only in a different sequence, and to enable better search results, as will become apparent from the description provided below with reference to FIG. 4.

In some instances, it can also be helpful to map attributes and characteristics of the terms being used to create a tuple. For instance, if a word is capitalized, it can be helpful during subsequent searching to identify this characteristic, such as during incrementally graduating searching, even if such a characteristic is not initially incorporated as one of the original search criteria. If the terms are based on non-textual elements, the characteristics and attributes of these elements can also be mapped into a table such as table 300 or a related table.

Mapping numerical representations of terms to tuples can comprise part of the recited act of creating a tuple (520). Similarly, mapping words to synonyms, custom terms or partial words can also be considered part of creating a tuple when the tuple includes or is based on the synonyms, custom terms or partial words. For example, the text "be" can be mapped in a table of partial words referring to any word starting with the letters "be", such as the word "beginning", which is found in the string of text, or any other word starting with the letters "be". In other instances, tables are created to map partial terms with words having the letters of the partial terms found in the middle or end of the text. Each of these tables or partial word indexes can be used to identify terms for creating a tuple. In particular, a chain of references between any number and combination of tables and indexes can be made such that non-textual elements, complete words, or partial words can be associated with different terms in one table or index and which in turn are used to identified another term or word in a different index or table such as table similar to the numerical word reference table 300 shown in FIG. 3. By way of example, the identification of the term "begin" could be associated with the gerund form of the word, "beginning", in one table, which is associated with the word reference "3" in table 300. The numerical reference "3", corresponding to "begin" through multiple tables can then be used to form part of a tuple.

Although much of the foregoing description regarding tuples has related specifically to the creation of a tuple index, it will be appreciated that the creation of tuples is also directly involved with defining the scope of a search. For instance, if the text "be . . . wa . . . th" is entered as a search request, mapping the partial terms "be . . . wa . . . th" to the terms "beginning was the", through any number of tables, can be useful to create a tuple based on three words that can quickly and easily be found within the tuple index of the text 200. In the foregoing and later examples, the use of quotations is generally being used to encapsulate the terms of a search. In these examples, it is not suggested that the quotations form part of the search, although in some embodiments quotations can be used as part of a search.

Concept words can also be created and used to index and refer to terms which are commonly found together. For example, two or more terms can be assigned a single identifier, such that they are considered a single word within a tuple. For example, the terms "In the" could be assigned a numerical reference "8", such that any reference to the term "8" in a tuple refers to the terms "in the". In this regard, the concept word can operate much like a tuple, only comprising part of the tuple. One benefit of using concept words is to facilitate compression and storage of indexed data and to improve speed and accuracy of some searches and to provide a different level of searching that can be applied to the incrementally graduating searching techniques described herein.

In some embodiments, a 5-tuple search can also be performed through the use of a 2-tuple, 3-tuple and/or 4-tuple pattern index. For example, several smaller tuples can be searched and identified in a document. Intersections between the smaller tuples can then be identified as corresponding to a larger tuple, such as the 5-tuple, in a similar fashion to how existing systems perform intersections of individual terms. However, unlike existing systems, the present invention performs searching using a molecular like search, which provides significant advantages over the atomic, individual term, searching paradigm. Accordingly, even if smaller tuples are used, and then later intersected, the use of the tuples still provides at least some dynamic filtering during the search and prior to identifying the intersections, as occurs when using the larger tuples.

Reference will now be directed to FIG. 4, which illustrates several examples of entries 400 that can be entered (530) into a tuple index. As shown, the illustrated entries 400 correspond to various tuples 410 that are based on three word combinations 420. For example, the first illustrated entry "1:123 1cap In the beginning (v1)" corresponds to the referenced combination 202 of terms from the original string of text 200 in FIG. 2. These terms were also mapped by the table in FIG. 3, as generally described above, in such a way that the term "in" is associated with the numerical reference "1", the term "the" is associated with the numerical reference "2", and such that the term "beginning" is associated with the numerical reference "3." With this mapping and association between the words and the numerical references, a tuple can be created (520) comprising the numerical designation "123", which correspondingly represents the terms "in the beginning."

FIG. 4 also illustrates how other information 430 can be provided in a tuple index with the tuple entries 410. For example, information described above in reference to FIG. 3 and corresponding to the attributes and characteristics of the referenced terms can be provided in the entries. Likewise, a sequence of the terms can be provided. Identifying the sequence of terms can be particularly helpful for facilitating sorting (540) and compressing (550) of the tuples and tuple indexes, which can be correspondingly helpful to save space and speed up certain searching processes, and in such a way that the original order of the terms is not lost.

The entries shown in FIG. 4, for example, have been sorted according to a numerical order. In particular the tuple entries 410 of FIG. 4 sequentially identify each numeral in the tuples 410, notwithstanding the original sequence in which the associated terms are found in a document. For example, the eighth tuple entry 435 comprising: "4:245:213 was the Word (v1)" includes the tuple "245" which corresponds directly to the terms "the was Word", in that order. However, this is not the order in which the terms were found in the string 200. To the contrary, the words are actually ordered in the following sequence: "was the Word." However, the numerical references of the tuple have been rearranged into an order that facilitates sorting (540) and compression (550), based on numerical association, as mentioned above. Nevertheless, means are provided for tracking and preserving a record of the proper sequence of terms referenced by the tuple, as described above.

In one embodiment, for example, the tuple entries in the tuple index can also include order dependent references to the order in which they are found within the document. For example, the eighth entry 435 of FIG. 4, described above, also includes an order sequence "213". This order sequence corresponds directly to the referenced terms of the tuple "246". In particular, the first character of the order sequence "2" corresponds to the first character of the tuple "2", indicating the term should be ordered second within the tuple. Even more particularly, the order sequence indicates that the term "the" (which is identified by the first character "2" of the tuple) is the second word in the tuple (as indicated by the first character "2" of the order sequence). Likewise, the second character of the order sequence "1" indicates that the term "was" (identified by the second character "4" of the tuple) is the first word of the tuple. Finally, the third character of the order sequence "3" indicates that the term "was" (identified by the third character "5" of the tuple) is the third word of the tuple. Accordingly, by using the sequencing information it is possible to see that the eighth tuple entry 435 comprising a tuple 246 and having a sequence of 213 corresponds directly to the text "was the Word," and which corresponds directly to the combination of terms 205 derived from the string of text in FIG. 2.

Although the foregoing example has been provided with regard to numerical sequencing and sorting of the tuples in the tuple index, it will be appreciated that different schemes for ordering the tuples can also be utilized, such as, but not limited to, an alphabetic order based on the referenced terms. Although sorting can help improve and facilitate compression of the tuple index, as well as searching speeds of the index, it will also be appreciated that sorting is not necessary and does not necessarily have to improve compression or searching speeds. In fact, tuples can be indexed in either order dependent or independent fashion.

Although compression is not necessary, it can be useful to compress (550) tuple entries and/or tuple indexes so as to preserve memory and storage capacity. Compression of the tuple indexes can be particularly useful when numerous tuple indexes are created of varying type and degree for the same content. Any compression techniques known by those of ordinary skill in the art can be used to compress the tuple entries and tuple indexes.

Although the foregoing examples describe embodiments for preserving the order of word sequence in a tuple index, it will be appreciated that it is not necessary to do this. For example, in some embodiments searching with tuples is performed irrespective of the order of the words referenced by the tuple are found in a document.

As further illustrated in FIG. 4, the indexed entries 400 can include pointer information or reference information 440, which will help identify electronic content and/or a location within electronic content. In the present example, the reference information 440 refers to a word placement within a particular verse (identified by the text (v1) or (v2)) with the word information 420. Other identification or reference information, such as the attributes and characteristics of the referenced terms can also be provided. For example, the first entry 445 includes the identification of the first term being capitalized. This identification is provided by the number 1 followed by the text "cap".

In other embodiments, the designation "NoStp" or other another identifier or flag can be used to indicate that a particular tuple does not include any stop words. A stop word can be any predefined word, as defined above. In some embodiments, stop words are identified in a list or a table and include a common words such as the terms "the, in, was, a, there, an" and so forth. If a tuple is created that omits stop words, the entries in the tuple index preferably, although not necessarily, indicate as much. Entry 455 illustrates a reference "NoStp", which indicates that the tuple "358" corresponds to terms without stop words. Accordingly, the terms "beginning Word God" corresponding to the tuple referencing a string of text with stop words, such as "was" and "the" omitted from the text.

In other embodiments, flags or entries in the index can include references to relevance metrics that identify terms or tuples having particular relevance based on any predetermined criteria, such as, but not limited to a location in an electronic database or document, punctuation, proximity to other terms, and so forth. These relevance metrics can also be used to help perform dynamic filtering and subsequent filtering during an incrementally graduating search. These flags can also include reliability and level of confidence flags or metrics that are associated with the tuple and that can be quickly referenced during searching and prioritization of the identified documents and records to provide a desired and filtered search result of the tuples or corresponding documents. The level of confidence and reliability measures can include any combination of static and dynamic measures that can be preset and dynamically altered based on search results, links and references to the corresponding tuples documents and records, as well as virtually any other rules and criteria, in order to satisfy virtually any filtering and prioritization scheme.

When tuples are created from user input comprising part of a search request, the user input can also have stop words omitted from the search terms, such as, for example, during a first search, and such that the more relevant search terms can be processed without requiring processing of every documents containing every search term (e.g., the stop terms). In this manner, it is possible to improve the speed and to decrease the processing requirements of certain searches without compromising accuracy or effectiveness. Subsequent searches can then be performed, if necessary, which include the search terms.

Many different types of tuple entries can be created utilizing any of the foregoing features. Likewise, many different tuple indexes can be created for the same content, only using different indexing techniques and requirements. Accordingly, when an incrementally graduating search is performed, a first tuple index can be searched, followed by subsequent searching of a more granular tuple index. Subsequent searching can also include a more complete search of the first tuple index. In such embodiments, tuple indexes having tuples based on many words would be considered more granular than tuple indexes having tuples based on fewer words. Tuple indexes can also be searched more thoroughly during subsequent searching by referencing sequence and other information that might not have been referenced on an initial or earlier search, including, but not limited to stop words. Context information corresponding to the document or genre can also be indexed and used to characterize certain entries or indexes that are used in the searches, as described in more detail below.

In view of the foregoing, it will be appreciated that there are many different ways in which tuple indexes can be created and that there are many different types of tuple indexes and related indexes that can be created to facilitate searching.

Some methods for searching tuple indexes and for performing incrementally graduating searching will now be described with reference to the flowchart 600 of FIG. 6.

Figure 6:
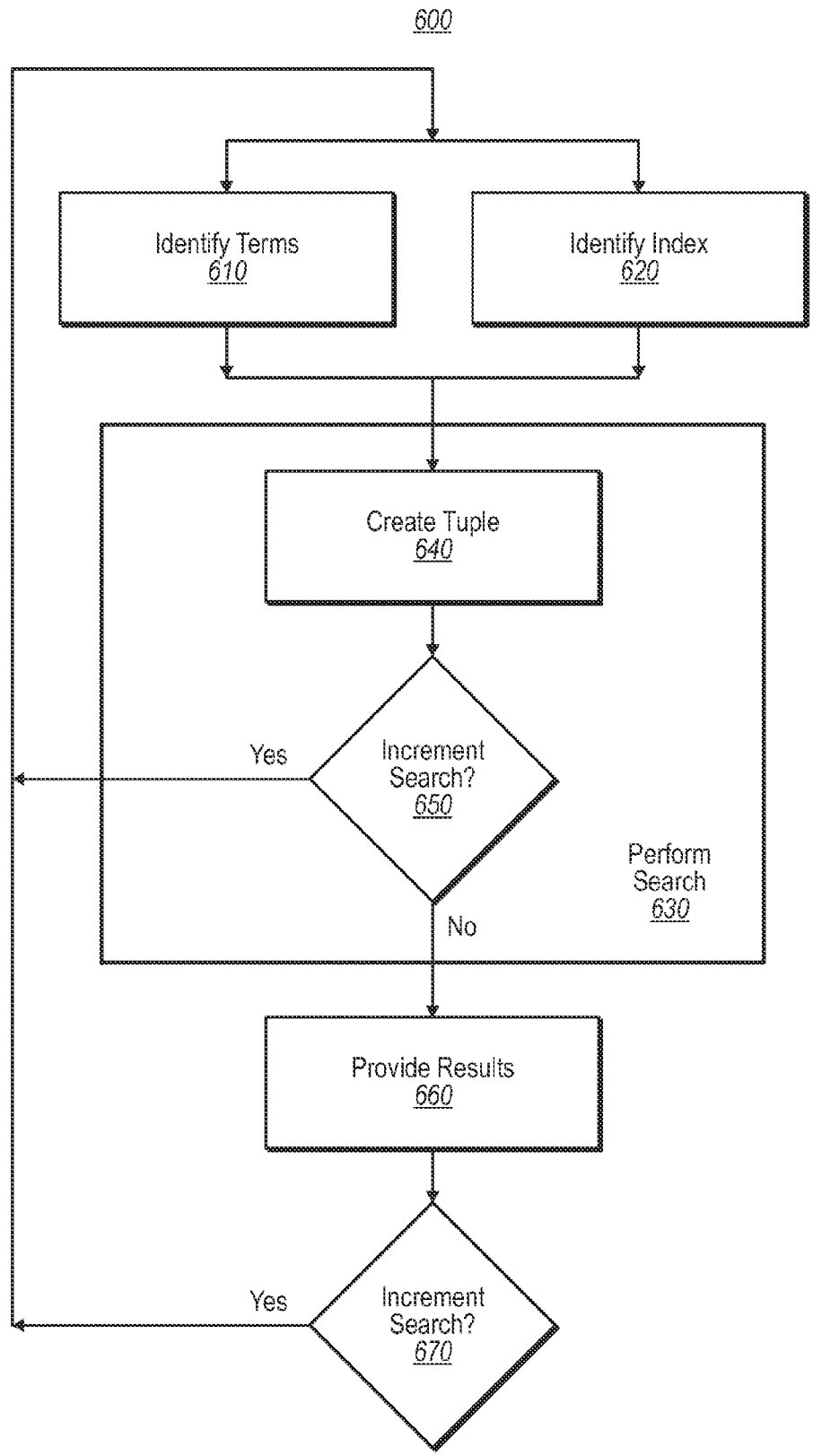
FIG. 6 illustrates a flowchart of acts corresponding to embodiments for performing a search according to certain embodiments of the invention.

As shown in FIG. 6, the flowchart 600 includes various acts related to searching. These acts include identifying search terms (610), identifying an index (620), creating a tuple (640), determining whether to increment a search (650 and 670), and providing results (660) of the search. The illustrated chart also illustrates the step for performing a search (630), which in some instances includes the corresponding acts of creating a tuple (640) and determining whether to increment a search (650). It will be appreciated, however, that the functional step for performing a search can include any corresponding acts that would enable such a search to be performed.

It is common for existing search engines and applications to request user input comprising one or more search terms, which will then be searched for in one or more electronic documents. Typical search engines perform such a search using a full-text index that identifies every word and location of every word within a document. Such searching is relatively inefficient for at least the reasons described above in the background section.

The present invention overcomes many of the problems associated with existing search engines by providing means to search for documents or content corresponding to search terms and without necessarily requiring every document containing the search terms to be processed during search. To further improve the efficiency of the search, the analysis and searching process can begin as soon as any input is entered by the user, and prior to receiving a completed set of input. For example, keystroke analysis can be performed to identify potential search terms and to begin performing the search even before the search request is officially submitted by the user. Such techniques can also be applied to suggest search terms that will likely enable a good search result. Such suggestions can be based on any combination of previously entered user input, including only characters or complete words.

When user input is detected as either a key stroke or a submitted search request, the modules of the present invention analyze the user input and identify (610) one or more terms to be searched. These identified terms can be the actual terms submitted by the user as well as substitute, derivative or alternative terms that are derived from the input provided by the user. To identify the terms, any number of indexes can be identified (620) and referenced, such as, but not limited to custom indexes (having user defined custom terms), tuple indexes, partial word indexes, stop word indexes, phonetic indexes and alternate word meaning indexes. Thesauruses, dictionaries, cookies, and other reference information can also be broadly construed as indexes in this regard. Any predetermined and custom rules can also be applied to determine which terms to use based on the user input.

A search is then performed (step 630). In some instances, the search can be performed dynamically, while search input is still being entered. This can be useful, for example to identify and suggest terms to the user that might provide the user a more desirable and focused search result. For example, by dynamically analyzing the key strokes or terms entered by a user as part of a search request, searching can begin, which is transparent to the user, and to identify content satisfying the search. From that identified content, it can be determined which additional terms will focus the search. This can be accomplished, for example, by evaluating tuple entries in tuple indexes and identifying which remaining terms would complete a string of search terms corresponding to a known tuple entry. Other indexes such as partial word indexes, thesauruses, dictionaries and custom indexes can also be used, in isolation, or in cooperation with the tuple indexes and other indexes to identify potential search terms to suggest to a user. The user can either accept or reject the suggested terms. Suggestions can be made with pull-down menus, pop-ups, overwriting elements, or any other desired interface.

Dynamic searching can also be useful to determine when no content will correspond to the search terms, such as may occur when search terms are being misspelled or entered improperly. If the search terms are dynamically determined to be bad in this regard, new search terms can be suggested prior to the user formally submitting the search request and such that the user can dynamically be informed of possible errors.

Various user interfaces can be provided to facilitate the forgoing embodiments, such that the invention is not limited in scope to any particular type of graphical user interface.

Once the terms and indexes are identified for a search, the search is performed. This can include referencing the identified indexes for content containing or corresponding to the identified terms. In some embodiments, this includes referencing at least a tuple index to look for entries containing tuples corresponding to the search terms. To do this, the search terms or corresponding search terms (as determined through the use of the various indexes) are converted into a tuple. That tuple is then compared to the indexed tuple entries. Every matching tuple entry can then be returned as part of the search result. Other indexes can be used independently from or in combination with the tuple indexes.

After a search is performed, either dynamically in real-time (e.g., with keystroke analysis) or in response to a formal request, the results are provided to the user (660).

In some instances, the results of the search are prioritized for the user. This prioritizing will often consider the context in which a user is operating, as defined by the user prior to or during the search or based on other factors. For example, if an application performing the search corresponds to a particular context, such as a genealogical or scriptural reference application, that context can be given priority, such that documents corresponding to that context will be given higher priority than content matching the search request that is not associated with the particular context.

When the search is performed dynamically, the results sometimes take the form of auto-suggest and auto-complete text. In other instances, a complete set of search results is provided and dynamically modified as new input is received or as new considerations are made with regard to different search terms or referenced indexes.

If the search is determined to be inadequate for any reason, such as when too much or too little content is identified, the search can be incrementally advanced, to either perform a more granular or a less granular search, as necessary. Various interface options can be provided to a user to indicate whether an incremented search is necessary. In some instances, predetermined rules and criteria can also be used alone to automatically determine when an incremented search should be performed. A combination of user input and predetermined rules and criteria can also be applied to make the determination of whether an incremented search should be performed (650, 670).

When it is determined that an incremented search should be performed (650 670), the searching process is repeated with new terms, new indexes, or new search criteria and without requiring the user to provide any new search terms. Any new terms, indexes, and search criteria can be identified and determined from the predetermined rules and criteria. Incrementing the search can result in a change of terms being considered, such as through the addition of new terms, the omission of some terms and/or the replacement of terms. New or different indexes can also be considered and referenced during the search to find matching or corresponding entries that can be presented to the user in an appropriate format.

The format in which results can be presented to the user can also vary. For example, the results can be textual references to content, hyperlinks to documents, links to specific portions of a document, or any other type of results.

Although much of the foregoing description and many of the foregoing examples have been directed to the application of the present invention to the area of full-text type databases, it will be appreciated that the invention also applies to other types of databases, such as traditional field-based databases, as mentioned above.

To further illustrate the flexibility and utility of the present invention, an additional example will now be provided with regard to a field-based database, as might maintain census or genealogical information, as well as many other types of information.

Figure 7:
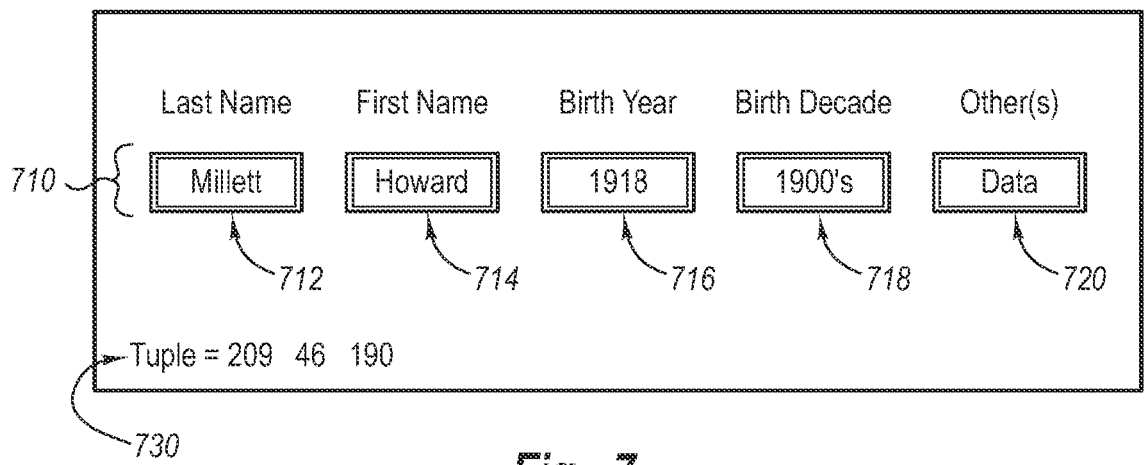
FIG. 7 illustrates one embodiment of fields corresponding to a database.
Figure 8:
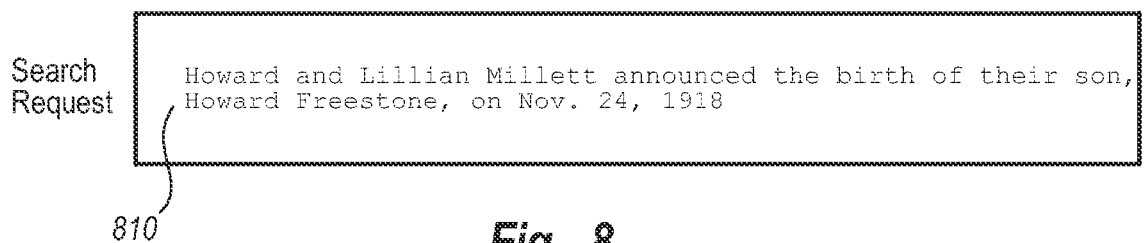
FIG. 8 illustrates one embodiment of a textual search request.

FIG. 7, for example, illustrates various fields 710 that might occur in a census or genealogical field-based database. In this illustration, fields are provided for a last name 712, first name 714, birth year 716, birth decade 718, as well as other data fields 720.

The terms or data provided in any combination of the foregoing fields 712-720 can then be combined and indexed as a tuple in a tuple index, according to the principles described above. For example, a word index can reference or associate terms with numbers or other appropriate references, to facilitate compression. These references can then be combined into tuples and indexed with appropriate references to the entries corresponding to the intersecting field data that is used to form the tuple. In the present example, for instance, a tuple 730 can be created with the numbers 209 46 and 190, which might correspond to the referenced terms Millett (last name), Howard (first name) and 1900's (Birth Decade). It will be appreciated, however, that the foregoing example is merely illustrative and should not be construed as limiting the scope of the invention. An appropriate reference to a document number, as usual, can also be included with the tuple 730, as well as any other appropriate information during indexing of the tuple 730.

Figure 9:
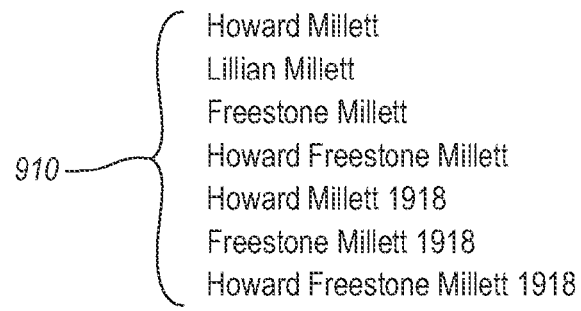
FIG. 9 illustrates one embodiment of a set of search tuples corresponding to the search request of FIG. 8.

Thereafter, when a search is performed, a free text search query can be broken down into various search tuples that are applied to the tuple index, as described above in the other examples. For instance, the search request 810 comprising the text "Howard and Lillian Millett announced the birth of their son, Howard Freestone, on Nov. 24, 1918," could be broken down into the following various search tuples 910, shown at FIG. 9: Howard Millett, Lillian Millett, Howard Freestone, Howard Millett 1918, Lillian Millett 1918, Howard Freestone 1918, as well as many others. These tuple combinations can then be converted into numeric or other representations and can then be applied in a search of an appropriate tuple index to find the one or matching tuple references. In view of the foregoing, it can be seen how a search can be quickly focused down to relevant hits, without having to search through every field individually and look for intersecting data.

In summary, embodiments of present invention overcome many of the problems associated with existing search engines by providing means to search for content corresponding to search terms and for performing dynamic filtering and prioritizing during the search and for performing a search on a molecular-type model, as compared to the prior art systems that only prioritize and filter after performing the search on an atomic-type model. In particular, certain embodiments of the invention provide means for intrinsically introducing priority into a search through the use of unique tuple pattern indexes, as described above. Means are also provided for incrementally improving or modifying the scope of a search without requiring or receiving additional search terms from the user.

Although some of the forgoing embodiments have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a search for content in an electronic database using a tuple index with separately indexed tuple word combinations, the method comprising:

creating the tuple index comprising a plurality of tuples, wherein each tuple comprises three or more terms found within electronic content, wherein at least two tuples in the tuple index include two terms in common and one different term;

receiving a search request that includes two or more search terms;

creating one or more tuples from the two or more search terms including creating a first sequence identifier to represent a first tuple created from the two or more search terms;

performing a search for documents of the electronic content that match the search request by comparing the one or more tuples created from the two or more search terms to the plurality of tuples in the tuple index; and providing a plurality of documents as results of the performed search including ranking two or more documents in the results based on the two or more documents each containing the first tuple, but having a different sequence identifier associated with the first tuple such that a document containing the first tuple and a sequence identifier that matches the first sequence identifier is ranked higher than a document containing the first tuple and a sequence identifier that does not match the first sequence identifier.

2. A method as recited in claim 1, wherein the one or more search terms are received from a local computing system.

3. A method as recited in claim 1, wherein the one or more search terms are received from a remote computing system.

4. A method as recited in claim 1, wherein each term included in a tuple of the tuple index is represented by an integer such that each tuple consists of two or more integers, the method further comprising:

sequentially ordering the integers within each tuple, and sequentially ordering each tuple within the tuple index based on the integers of each tuple.

5. A method as recited in claim 4, wherein creating one or more tuples from the two or more search terms comprises referencing at least one other index.

6. A method as recited in claim 5, wherein said at least one other index is a partial word index that associates incomplete words with complete words.

7. A method as recited in claim 5, wherein said at least one other index is one of a dictionary, thesaurus and a phonetic word index.

8. A method as recited in claim 1, wherein the one or more search terms are consecutive words in a string of words, with only stop words omitted from the string of words, the stop words being predefined by a stop word index.

9. A method as recited in claim 1, wherein the search is performed dynamically while search input is still being entered such that the plurality of documents are provided as results while search input is still being entered.

10. A method as recited in claim 9, wherein dynamically performing the search includes performing keystroke analysis as input is being received.

11. A method as recited in claim 1, wherein performing the search includes determining whether at least one of new search criteria, a new search term and a new index should be considered in a subsequent search.

12. A method as recited in claim 11, wherein performing the search includes incrementally applying at least one of the new search criteria, new search term and new index to the subsequent search and prior to receiving any additional search terms from the user.

13. A method as recited in claim 11, further comprising: providing results of the performed search dynamically while search input is being received.

14. A method as recited in claim 1, wherein the one or more search terms consist of one or more partial and incomplete words.

15. A method as recited in claim 1, wherein providing the results includes sorting the results according to a document reliability or document relevance measure associated with the tuples.

16. A method as recited in claim 1, wherein the electronic database is a structured electronic database.

17. A computer program product comprising one or more computer-readable storage media having computer-executable instructions for implementing the method recited in claim 1.

18. A computer program product as recited in claim 17, wherein the one or more search terms are received from a local computing system.

19. A computer program product as recited in claim 17, wherein the one or more search terms are received from a remote computing system.

20. A computer program product as recited in claim 17, wherein each term included in a tuple of the tuple index is represented by an integer such that each tuple consists of two or more integers, the method further comprising:

sequentially ordering the integers within each tuple, and sequentially ordering each tuple within the tuple index based on the integers of each tuple.

21. A computer program product as recited in claim 20, wherein creating one or more tuples from the two or more search terms comprises referencing at least one other index.

22. A computer program product as recited in claim 21, wherein said at least one other index is a partial word index that associates incomplete words with complete words.

23. A computer program product as recited in claim 21, wherein said at least one other index is one of a dictionary, thesaurus and a phonetic word index.

24. A computer program product as recited in claim 17, wherein the one or more search terms are consecutive words in a string of words, with only stop words omitted from the string of words, the stop words being predefined by a stop word index.

25. A computer program product as recited in claim 17, wherein the search is performed dynamically while search input is still being entered such that the plurality of documents are provided as results while search input is still being entered.

26. A computer program product as recited in claim 25, wherein dynamically performing the search includes performing keystroke analysis as input is being received.

27. A computer program product as recited in claim 17, wherein performing the search includes determining whether at least one of new search criteria, a new search term and a new index should be considered in a subsequent search.

28. A computer program product as recited in claim 27, wherein performing the search includes incrementally applying at least one of the new search criteria, new search term and new index to the subsequent search and prior to receiving any additional search terms from the user.

29. A computer program product as recited in claim 27, further comprising: providing results of the performed search dynamically while search input is being received.

30. A computer program product as recited in claim 17, wherein the one or more search terms consist of one or more partial and incomplete words.

31. A computer program product as recited in claim 17, wherein providing the results includes sorting the results according to a document reliability or document relevance measure associated with the tuples.

32. A computer program product as recited in claim 17, wherein the electronic database is a structured electronic database.

* * * * *